(12) United States Patent
Zeller et al.

(10) Patent No.: US 7,430,930 B2
(45) Date of Patent: Oct. 7, 2008

(54) SAMPLER FOR TAKING A DEFINED AMOUNT OF SAMPLE OF A FLUID MEDIUM FROM A SAMPLE-TAKING SITE

(75) Inventors: Robert Zeller, Lechbruck (DE); Peter Dietrich, Nesselwang (DE)

(73) Assignee: Endress + Hauser Wetzer GmbH + Co. KG, Nesselwang (DE)

( * ) Notice: Subject to any disclaimer, the term of this patent is extended or adjusted under 35 U.S.C. 154(b) by 222 days.

(21) Appl. No.: 11/088,745

(22) Filed: Mar. 25, 2005

(65) Prior Publication Data
US 2005/0268733 A1 Dec. 8, 2005

(30) Foreign Application Priority Data
Mar. 25, 2004 (DE) .................. 10 2004 015 083

(51) Int. Cl.
*G01N 1/00* (2006.01)

(52) U.S. Cl. .................................... 73/864.34

(58) Field of Classification Search ............ 73/864.34, 73/864.73, 864.74, 863.83, 863.84, 863.01, 73/863.02
See application file for complete search history.

(56) References Cited

U.S. PATENT DOCUMENTS

| | | | | |
|---|---|---|---|---|
| 3,591,318 A * | 7/1971 | Knapp | .................. | 417/465 |
| 4,415,011 A * | 11/1983 | Grant | .................. | 141/284 |
| 4,942,770 A * | 7/1990 | Seifert et al. | ............. | 73/864.34 |
| 4,972,705 A * | 11/1990 | Fryer et al. | ............. | 73/152.18 |
| 5,117,370 A * | 5/1992 | DeCello et al. | ............... | 702/25 |
| 5,779,463 A * | 7/1998 | Rossel et al. | ................. | 418/94 |
| 6,453,759 B1 * | 9/2002 | Lebski et al. | ............ | 73/864.34 |
| 6,635,224 B1 * | 10/2003 | Gui et al. | ...................... | 422/62 |
| 2004/0226354 A1* | 11/2004 | Schmidt | .................. | 73/118.1 |
| 2005/0150314 A1* | 7/2005 | Staples et al. | ............ | 73/863.01 |

\* cited by examiner

*Primary Examiner*—Robert R Raevis
(74) *Attorney, Agent, or Firm*—Bacon & Thomas, PLLC

(57) ABSTRACT

A sampler for taking a defined amount of sample of a fluid medium from a sample-taking site, with a tubular line, which can be brought into contact with the fluid medium at the sample-taking site, for conducting the fluid medium into at least one sample storing receptacle, with a pump. The pump moves the medium via the tubular line into the sample storing receptacle. A sequence control activates the pump, such that it dispenses the defined amount of sample into the sample storing receptacle. The pump is a rotary piston pump.

3 Claims, 1 Drawing Sheet

SAMPLER FOR TAKING A DEFINED AMOUNT OF SAMPLE OF A FLUID MEDIUM FROM A SAMPLE-TAKING SITE

FIELD OF THE INVENTION

The invention relates to a sampler for taking a defined amount of sample of a fluid medium from a sample-taking site by means of a tubular line, which can be brought into contact with the fluid medium at the sample-taking site and via which the fluid medium can be conducted into at least one sample storing receptacle, with a pump, which moves the medium via the tubular line from the sample-taking site into the receptacle, and with a control unit, which activates the pump such that it fills the defined amount of sample into the receptacle.

BACKGROUND OF THE INVENTION

Corresponding samplers are already known from the state of the art. Available from Endress+Hauser for instance, are the transportable and stationary ASP-Port 2000 and ASP-Station 2000 samplers for the defined taking of samples of a fluid medium from a sample-taking site. In the know samplers, vacuum diaphragm, or membrane, pumps are used; the metering of the samples into the sample storing receptacles occurs by means of microprocessor-controlled, pneumatic components.

In the known samplers, the vacuum principle is used. The sequence control in the sample-taking works as follows: In a first step, the metering unit is pneumatically sealed-off, by the closing of a pinch valve, in order to seal the flexible, tubular line in the form of an outlet hose. The diaphragm pump then blows through the metering container to empty the suction line. This is followed by the sucking-in of fresh sample, until a defined fill level is reached in the metering container. In a third step, a selected, defined sample volume is metered; excess sample flows back to the sample-taking site. Finally, the pinch valve is re-opened, and the metered amount of sample is discharged into the sample storing receptacle.

In the case of this known technique, problems arise in certain cases in that, during the collecting of the sample, a sedimentation of the sample can occur in the metering container, which potentially can lead to a corruption of the sample.

Another sampler known from the state of the art is also available from Endress+Hauser known as the Liqui-Port 2000 sampler. The Liqui-Port 2000 sampler is a portable sampler for the fully automatic taking and distributing of samples of a fluid medium. The suction intake and metering of the sample liquid is done with a peristaltic pump. In such case, a flexible pump hose is periodically deformed by engaging rollers, whereby a pumping action is produced. For detecting the medium supplied in the tubular line, a pressure sensor is used. The sample-taking in the case of the Liqui-Port 2000 can occur at defined points in time, due to the presence of an integrated timer function. Additionally, it is possible to perform the sample-taking under quantity, or flow, control. The automatic sample distribution is accomplished by means of an automatically rotatable distributor pipe, which is positioned successively with reference to the individual storing receptacles arranged in a carousel.

SUMMARY OF THE INVENTION

An object of the invention is to provide a sampler of simplified structure.

This object is achieved by selecting, as the pump, a rotary piston pump. Rotary piston pumps are generally known and available from, among others, the firm Börger in various embodiments for various applications. Rotary piston pumps are durable and require little maintenance.

In a preferred further development of the sampler of the invention, such is embodied as a mobile unit or as a stationary unit.

A preferred embodiment of the sampler of the invention provides a sensor, with which the amount of sample supplied through the tubular line and/or dispensed into the sample storing receptacle is determined. Especially, the sensor is an angle, or rotation, sensor, which registers the angular rotation and/or rotary movement of a rotary shaft of the rotary piston pump; the sequence control operates the rotary piston pump on the basis of the measured value delivered by the angle, or rotation, sensor, such that the defined amount of sample is supplied through the tubular line into one of the sample storing receptacles. Thus, with the rotary piston pump, a flow-proportional sample-taking can be implemented in simple manner, since the rotation of the piston of the pump has a defined relationship with the supplied volume of sample. In principle, it is, therefore, sufficient to register the rotation of the piston and suitably evaluate such in known manner. The construction of the sampler of the invention is very simple in this respect, since it comprises just the rotary piston pump and a rotation sensor, which registers the revolutions of the piston.

Additionally, an advantageous further development of the sampler of the invention provides that the sensor is a measuring device for determining the flow through the tubular line. Especially, the flow measuring device is a pressure sensor. An appropriate pressure sensor is used, for example, in the transportable Liqui-Port 2000 sampler, which is, as indicated above, available from the assignee. Naturally, also any other kind of flow measuring device can be used in connection with the sampler of the invention.

Alternatively, or supplementally, the sensor, in the simplest case, can be a detector that recognizes whether a medium is flowing through the tubular line, or not.

In order to enable an automatic sample-taking, a further development of the apparatus of the invention provides that a timer function is included, which starts the sample-taking at predetermined points in time.

BRIEF DESCRIPTION OF THE DRAWINGS

The invention will now be explained in greater detail on the basis of FIG. 1, which is a schematic drawing of an embodiment of the sampler of the invention.

DESCRIPTION OF THE PREFERRED EMBODIMENT

Figure 1:
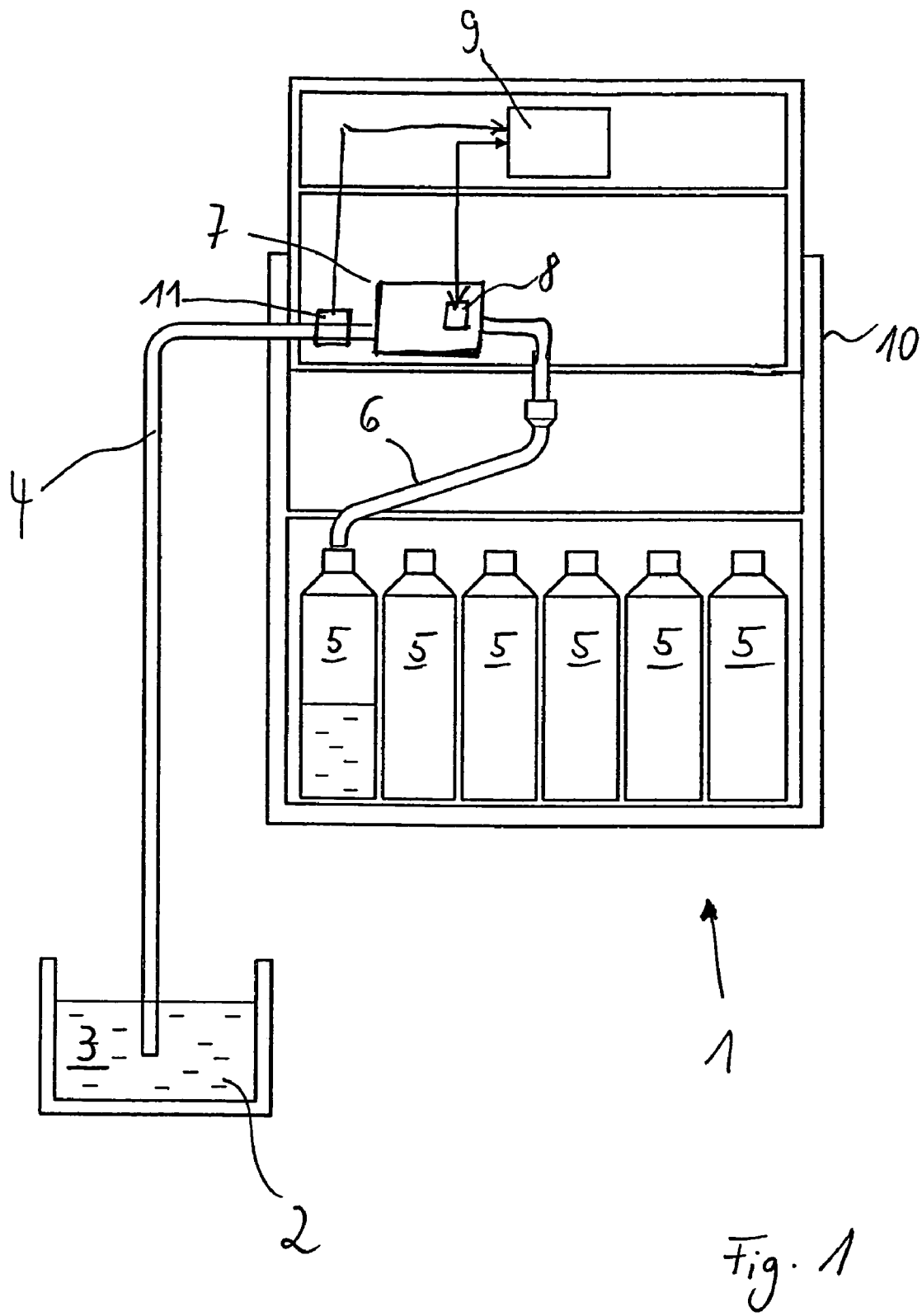

The sampler 1 of FIG. 1 serves for the taking of defined amounts of sample of a fluid medium 3 from a sample-taking site 2; the samples collected by suction are dispensed via the distributor system 6 successively into the provided sample storing receptacles 5. If needed, a cooling system is provided in the sampler 1, for cooling the samples taken from the sample-taking site to a desired temperature. Appropriate cooling systems are sufficiently known and are available, for example, from the assignee in connection with the aforementioned types of samplers.

The sample-taking from the sample-taking site 2 occurs, as indicated above, via the tubular line 4. By means of the rotary piston pump 7, the fluid medium 3 is sucked out of the sample-taking site 2, and a pre-defined amount is supplied via the rotary piston pump 7 into one of the sample storing receptacles 5. The sequence control 9 controls e.g. the point in time when the sample is taken, the rotation of the rotary piston pump 7, and the correct positioning of the distributor pipe 6, as a part of the tubular line 4, relative to the sample storing receptacles 5. Usually, the sequence control 9, i.e. the electronics part, is spatially set apart from the "wet part", thus the components which come in contact with the fluid medium 3. Preferably, the electronics part is located in the upper part of the housing 10 of the sampler 1, as can be seen in FIG. 1.

In order to assure that always the defined amount of sample is dispensed into a sample storing receptacle 5, a angle, or rotation, sensor 8 is provided in the rotary piston pump 7, for registering the rotation of the piston. The number of revolutions of the piston of the rotary piston pump 7, or the angular rotation of the piston of the rotary piston pump 7, is proportional to the volume flow of the fluid medium 3 through the tubular line 4. Additionally, or alternatively, the flow of the fluid medium 3 through the tubular line 4 can be determined via a flow measuring device 11, e.g. a differential pressure sensor. The measured data of the flow measuring device 11 are forwarded via a connection cable to the sequence control 9 and evaluated there by a microprocessor.

The invention claimed is:

1. A sampler for taking a defined amount of sample of a fluid medium from a sample-taking site having:

at least one sample storing receptacle;

a tubular line, which is brought into contact with the fluid medium at the sample-taking site, for conducting the fluid medium into said at least one sample storing receptacle; a rotary piston pump, which moves the medium via said tubular line into said at least one sample storing receptacle;

a sequence control, which activates the pump, such that it dispenses the defined amount of sample into said at least one sample storing receptacle, and a sensor, with which the amount of sample conveyed through said tubular line and dispensed into said at least one sample storing receptacle is determined, wherein:

said sensor is one of: an angle sensor and a rotation sensor, which registers the angular rotation and/or the rotary movement of said rotary piston pump, and said sequence control controls said rotary piston pump on the basis of measured values delivered by said angle sensor or said rotation sensor such that the defined amount of sample is supplied through said tubular line into said at least one sample storing receptacle.

2. The sampler as claimed in claim 1, wherein:

the sampler is embodied as one of a mobile unit and a stationary unit.

3. The sampler as claimed in claim 1, wherein:

a timer function is provided, which activates the sampler at a predetermined point in time.

* * * * *